United States Patent Office 3,472,930
Patented Oct. 14, 1969

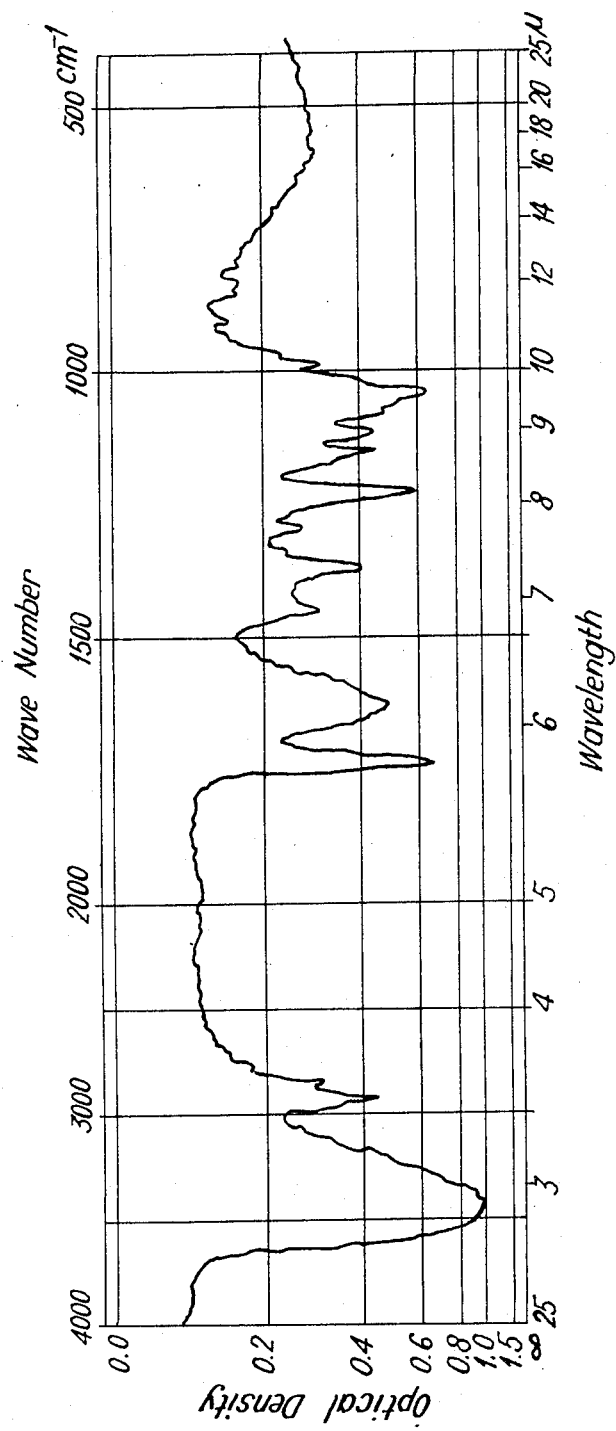

3,472,930
SPIRAMYCIN DERIVATIVE
Jean Preud'homme, Paris, and Serge Tchelitcheff, Vitry-sur-Seine, France, assignors to Rhone-Poulenc S.A., Paris, France, a French body corporate
Filed Dec. 27, 1966, Ser. No. 604,809
Claims priority, application France, Jan. 6, 1966, 45,088
Int. Cl. A61k 21/00; C08g 11/00; C08d 21/00
U.S. Cl. 424—121                                   2 Claims

ABSTRACT OF THE DISCLOSURE

The Spiramycin derivative is the triacetylated derivative of Spiramycin I, which is prepared by acetylating Spiramycin I with acetic anhydride at a temperature between 50° and 100° C. until four acetyl radicals are attached to the Spiramycin I molecule, and then removing one of the acetyl radicals by methanolysis. Triacetylated Spiramycin I has antibacterial properties.

---

This invention relates to a new derivative of Spiramycin I.

Spiramycin is an antibacterial antibiotic consisting of three constituents, Spiramycin I, Spiramycin II and Spiramycin III, of which R. Paul and S. Tchelifcheff, Bull. Soc. Chim. (3), 650 (1965), have determined the structural formulae.

Of these constituents, Spiramycin I is of particular interest because it can be directly obtained by fermentation on an industrial scale.

The new spiramycin derivative of the invention is a triacetylated derivative of Spiramycin I, the structural formula of which has not yet been determined.

According to a feature of the present invention, the triacetylated derivative of Spiramycin I is prepared by the process which comprises reacting Spiramycin I with acetic anhydride at a temperature within the range 50° to 150° C. until four acetyl radicals are attached to each molecule of Spiramycin I, and treating the resultant tetracetylated derivative of Spiramycin I with aqueous methanol to remove one of the acetyl radicals and yield the triacetylated derivative of Spiramycin I.

The acetylation is carried out in the absence or presence of a tertiary organic base, for example pyridine, triethylamine or dimethylaniline, preferably at a temperature of about 100° C. The introduction of four acetyl radicals on the Spiramycin takes a period of from 5 to 70 hours depending on the reaction temperature.

Methanolysis of the intermediate tetracetylated derivative of Spiramycin I is effected with a mixture of water and methanol, preferably by heating the reaction mixture at its reflux temperature. A temperature lower than that can be used, but then it is necessary to prolong the reaction period very considerably.

For therapeutic purposes, the triacetylated derivative of Spiramycin I obtained by the aforesaid process may be used as such or may be purified in order to obtain the pure crystalline substance. Purification may be carried out by conventional methods, in particular, by direct crystallisation from an appropriate organic solvent such as diisopropyl ether, counter-current distribution, chromatography, or extraction by means of a water-organic solvent mixture at an appropriate pH.

The triacetylated derivative of Spiramycin I has the advantage of being much more stable in an acid medium than Spiramycin I or the mixture of spiramycins. In fact, it retains all its antibacterial activity after 5 hours treatment with decinormal hydrochloric acid, whilst under these conditions Spiramycin I or the mixture of spiramycins lose 90% of their activity.

The new Spiramycin I derivative of the invention is antibacterially active like Spiramycin and its constituents. It is particularly interesting because, in experiments in vivo with bacterial infections in mice, it has, when administered orally, shown an antibacterial activity against streptococcal and pneumococcal infections which is two to three times greater than that of Spiramycin I or of the mixture of Spiramycins. As a result of its greater stability in an acid medium and its greater antibacterial activity in vivo, the new Spiramycin derivative of the invention presents a definite advance in relation to Spiramycin and its constituents.

The triacetyl derivative of Spiramycin I has the empirical formula $C_{51}H_{82}O_{18}N_2$ and the following physio-chemical properties: Appearance, cream powder; melting point: 156–157° C.; optical rotation: $[\alpha]_D^{20} = -97°$ (c.=1, ethanol); elementary analysis, C percent=60–60.5, H percent=8.2–8.4, O percent=28.3, N percent=2.6–2.65, $CH_3CO$ percent=12.5–12.9; ultraviolet spectrum (determined with an ethanol solution): absorption maximum at 230 millimicrons ($E_{1\ cm.}$=280).

Infrared spectrum (determined with tablets of a mixture with KBr):

This spectrum is shown in the accompanying figure in which the abscissae give the wavelength expressed in microns (lower scale) and the wave number in cm.$^{-1}$ (upper scale), and the ordinates give the optical densities.

The principal infra-red absorption bands of triacetyl Spiramycin I are given in the following table.

TABLE

| | | |
|---|---|---|
| 3420 vs. | 1370 s. | 1040 vs. |
| 2960 sh. | 1335 sh. | 1020 sh. |
| 2920 s. | 1292 m. | 985 m. |
| 2850 s. | 1270 w. | 965 m. |
| 2820 sh. | 1230 vs. | 945 sh. |
| 2770 m. | 1170 sh. | 930 sh. |
| 1730 vs. | 1150 s. | 900 m. |
| 1625 s. | 1115 s. | 850 m. |
| 1590 sh. | 1080 m. | 835 m. |
| 1450 s. | 1060 sh. | 800 w. | where:
vs.=very strong
s.=strong
m.=medium
w.=weak
sh.=shoulder

Spiramycin I, tetracetylspiramycin I and crystalline triacetylspiramycin I are chromatographed on a thin layer of alumina, using a 0.3 mm. thick layer of alumina deposited on a glass plate. After drying for 12 hours at ambient temperature, the support is activated by heating at 100° C. for 1 hour. Spots of 10 μl. of a benzene solution containing 0.1 mg./ml. of the products to be studied (say 1 μg. per spot) are then deposited. Development is carried out by means of a mixture of benzene and ethyl acetate (60:40 by volume) which is allowed to migrate for 15 to 17 cm. from the starting line. The chromatograms are then dried for 15 minutes in a current of warm air and thereafter biologically developed on an agar plate inoculated with *Bacillus subtilis*.

The following Rf values are obtained:

Spiramycin I: Rf=0
Tetraacetylspiramycin I: Rf=0.6
Crystalline triacetylspiramycin I: Rf=0.5

The following non-limitative examples illustrate the invention. In the following, the activity is determined biologically by the diffusion method, using *Bacillus subtilis* as the sensitive microorganism, and with reference to a sample of pure spiramycin as standard. This activity is expressed in units per mg. (u./mg.), the unit being the smallest quantity of product which when dissolved in 1 cc. of an appropriate culture medium inhibits the growth of *Staphylococcus aureus* ATCC 6538 P under specified conditions.

EXAMPLE I

Preparation of tetraacetylated Spiramycin I

A solution of Spiramycin I (1000 g.) in an acetylating mixture (5400 g.) obtained by mixing pyridine (4752 g.) and acetic anhydride (648 g.) is maintained at 100° C. for 24 hours. After cooling, the reaction mixture is poured onto ice water (10 kg.), the pH of the solution is brought to 7.5 by addition of 10 N caustic soda (800 cc.), and the mixture is extracted with chloroform (2 litres and then 1 litre). The chloroform solutions are combined and washed with water (4×4 litres), filtered and evaporated. The resulting residue is dried under reduced pressure (1 mm. Hg) and then redissolved in cyclohexane (30 litres). The solution obtained is filtered at 28° C. and then evaporated. The residual solid is dried under reduced pressure (1 mm. Hg) to give tetraacetylated Spiramycin I (1150 g.) of strength 1185 u./mg.; melting point: 148–152° C.; optical rotation $[\alpha]_D^{22} = -106°$ (c.=2, ethanol); $CH_3CO\% = 17.0$.

Preparation of triacetylated Spiramycin I

A solution of tetraacetylated Spiramycin I (1000 g.), prepared as described above, in a mixture (9000 cc.) of methanol (7200 cc.) and water (1800 cc.) is heated for 24 hours under reflux. After cooling, water (10 litres) is added and the mixture is extracted with methylene chloride (4 litres). After decantation, the methylene chloride solution is evaporated and the residual product is dried under reduced pressure (1 mm. Hg) at 60° C. to constant weight. There is obtained the triacetylated derivative of Spiramycin I (705 g.) of strength 1670 u./mg.; melting point: 148–150° C.; optical rotation $[\alpha]_D^{22} = -86°$ (c.=2, ethanol); $CH_3CO\% = 12.6$.

EXAMPLE II

Purification of triacetylated Spiramycin I by crystallisation

Crude triacetylated Spiramycin I (27.5 g.) obtained as described in Example I is dissolved in refluxing diisopropyl ether (50 cc.). The resulting solution is then crystallised in an ice bath with stirring for 24 hours. The crystalline product is filtered off, washed with diisoproply ether (3×10 cc.) and dried at 40° C. under reduced pressure (2 mm. Hg) for 12 hours. Crystals of triacetylated Spiramycin I (13.5 g.), melting at 150–152° C., are thus obtained.

EXAMPLE III

Purification of triacetylated Spiramycin I by counter-current distribution

Crude triacetylated Spiramycin I (44.5 g.) obtained as described in Example I is purified by counter-current distribution between the separate phases of a mixture consisting of benzene, cyclohexane, methanol and water (45:55:80:20 by volume), carrying out 300 transfers in a Craig apparatus, the cells of which are of 50 cc. capacity. The triacetylated Spiramycin I is then found in cells 140 to 210 (k.=1.38). The contents of cells 164 to 196 are combined and then concentrated to 200 cc. at 25° C. under reduced pressure. The resulting aqueous concentrate is twice extracted at pH 8.5 with an equal volume of benzene. The combined benzene extracts are washed with 20% of their volume of water, dried over anhydrous sodium sulphate and evaporated to dryness at 30° C. under reduced pressure (3 mm. Hg). Purified triacetylated Spiramycin I (15.6 g.), $$[\alpha]_D^{22} = -89.2°$$

(c.=1, ethanol) and strength 2300 u./mg., is obtained.

This product (6.4 g.) is dissolved with heating in diisopropyl ether (140 cc.). The resulting solution is filtered and concentrated to 50 cc. under reduced pressure. On cooling in an ice bath with stirring for 2 hours, colourless needless are obtained which are filtered off, washed with diisopropyl ether (5 cc.) and dried at 40° C. under reduced pressure (3 mm. Hg) for 12 hours. Crystalline triacetylated Spiramycin I (5.25 g.) of strength 2300 u./mg., melting at 150–152° C., is thus obtained.

This crystalline triacetylated Spiramycin I (3.75 g.) is redissolved with heating in diisopropyl ether (150 cc.), and the resulting solution is filtered and then concentrated to 45 cc. under reduced pressure. On crystallising in an ice bath as described above, recrystallised triacetylated Spiramycin I (2.5 g.) of strength 2300 u./mg., melting at 156–157° C. and having an optical rotation of $[\alpha]_D^{20} = -97°$ (c.=1, ethanol), is finally obtained.

The present invention includes within its scope pharmaceutical compositions comprising the new triacetylated derivative of Spiramycin I in association with a compatible pharmaceutically acceptable carrier or coating. The compositions may be administered orally, parenterally or rectally, oral administration being preferred.

The compositions are prepared and used in the same manner as compositions based on Spiramycin; compared to the latter, they have the advantage of improved activity and stability. Generally, for the treatment of bacterial infections in an adult, the compositions are administered orally so as to give a daily dosage of 1 to 4 g. of triacetylated Spiramycin I.

The following example illustrates a pharmaceutical composition according to the invention:

EXAMPLE IV

Tablets having the following composition are prepared by the usual technique:

|  | G. |
|---|---|
| Triacetylated Spiramycin I | 0.250 |
| Starch | 0.150 |
| Colloidal silica | 0.070 |
| Magnesium stearate | 0.030 |

We claim:

1. The triacetylated derivative of Spiramycin I, which has the following characteristics: empirical formula $C_{51}H_{82}O_{18}N_2$; melting point 156–157° C.; optical rotation $[\alpha]_D^{20} = -97°$ (c.=1, ethanol); elementary analysis C=60–60.5%, H=8.2–8.4%, O=28.3%, N=2.6–2.65%; acetyl content 12.5–1.9%; its ultra-violet spectrum (determined in ethanol solution) shows an absorption maximum at 230 millimicrons $$(E_{1\,cm.}^{1\%} = 280)$$

and its infra-red spectrum (determined with tablets of a mixture with potassium bromide shows principal absorption bands as follows: 3420 very strong, 2960 shoudlier, 2920 strong, 2850 strong, 2820 shoulder, 2770 medium, 1730 very strong, 1625 strong, 1590 shoulder, 1450 strong, 1370 strong, 1335 shoulder, 1292 medium, 1270 weak, 1230 very strong, 1170 shoulder, 1150 strong, 1115 strong, 1080 medium, 1060 shoulder, 1040 very strong, 1020 shoulder, 985 medium, 965 medium, 945 shoulder, 930 shoulder, 900 medium, 850 medium, 835 medium, and 800 weak.

2. Pharmaceutical compositions which comprise as active ingredient, an effective amount of the triacetylated derivative of Spiramycin I having the characteristics specified in claim 1 in association with a significant amount of a pharmaceutically acceptable carrier.

References Cited

FOREIGN PATENTS 796,311   6/1958   Great Britain.

OTHER REFERENCES

Takahira et al., The Journal of Antibiotics, Ser. A, vol. XVIII, No. 6, November 1965, pp. 269 and 270.

ALBERT T. MEYERS, Primary Examiner
JEROME D. GOLDBERG, Assistant Examiner

U.S. Cl. X.R.

260—343